United States Patent
Prabhu

(10) Patent No.: US 8,645,858 B2
(45) Date of Patent: Feb. 4, 2014

(54) NAVIGATING IN GRAPHICAL USER INTERFACE ON HANDHELD DEVICES

(75) Inventor: Sudhir Muroor Prabhu, Bangalore (IN)

(73) Assignee: Koninklijke Philips N.V., Eindhoven (NL)

( * ) Notice: Subject to any disclaimer, the term of this patent is extended or adjusted under 35 U.S.C. 154(b) by 179 days.

(21) Appl. No.: 13/062,962

(22) PCT Filed: Sep. 10, 2009

(86) PCT No.: PCT/IB2009/053955
§ 371 (c)(1),
(2), (4) Date: Mar. 9, 2011

(87) PCT Pub. No.: WO2010/029506
PCT Pub. Date: Mar. 18, 2010

(65) Prior Publication Data
US 2011/0164057 A1    Jul. 7, 2011

(30) Foreign Application Priority Data

Sep. 12, 2008  (EP) .................................. 08164254

(51) Int. Cl.
*G06F 3/00*    (2006.01)
(52) U.S. Cl.
USPC ........................... 715/783; 715/810; 345/650
(58) Field of Classification Search
USPC .................................. 715/783, 810; 345/650
See application file for complete search history.

(56) References Cited

U.S. PATENT DOCUMENTS 7,030,861 B1 *    4/2006  Westerman et al. ......... 345/173
7,469,381 B2 *   12/2008  Ording .......................... 715/702
2002/0075335 A1   6/2002  Rekimoto
2003/0085870 A1   5/2003  Hinckley
2006/0195438 A1 * 8/2006  Galuten ............................ 707/4
2008/0165152 A1 * 7/2008  Forstall et al. ................ 345/173
2009/0184933 A1 * 7/2009  Wei-Wen et al. ............. 345/173

FOREIGN PATENT DOCUMENTS

| DE | 102006055252 A1 | 5/2008 |
| WO | 0208881 A2 | 1/2002 |
| WO | 2005093550 A2 | 10/2005 |
| WO | 2006020305 A | 2/2006 |
| WO | 2008030976 A2 | 3/2008 |

OTHER PUBLICATIONS

"InsideMicrosoft: Part of the Blog News Channel"; Document on Windows Mobile 7, Downloaded From http://microsoft.blognewschannel.com/archives/2008/01/06/exclusive-windows-mobile-7-to-focus-on-touch-and-motion-gestures/, on May 12, 2008, 66 Page Document.
"Multi-Touch Technology"; Compilation of Internet Postings on Multi Touch Screens, Retrieved From http://www.multitouchtechnology.com/ on May 12, 2008, 11 Page Document.
Buxton, B.: "Multi-Touch Systems That I Have Known and Loved"; Document on Examples of Multi-Touch Technologies, Microsoft Research, Retreived At http://www.billbuxton.com/multitouchOverview.html, on May 9, 2008, 18 Page Document.

* cited by examiner

*Primary Examiner* — Kieu Vu
*Assistant Examiner* — Andrew Chung

(57) ABSTRACT

The invention relates to presenting and browsing in metadata on handheld display devices such as music/mp3 players, mobile phones, PDA's, digital cameras. A graphical user interface (GUI) accesses metadata arranged in different categories and determines a hierarchical order of this. A metadata category is shown in a menu of category entries in a separate pane on the GUI. Rotation of the device is detected by a rotation sensor, and upon rotation the pane with the menu being browsed before rotation is maintained in the GUI, and at least one pane a menu representing a hierarchical super- or sub-category of the category being browsed before rotation is added or removed. This allows the user to expand or collapse metadata categories shown in the GUI by rotating the device.

5 Claims, 4 Drawing Sheets

NAVIGATING IN GRAPHICAL USER INTERFACE ON HANDHELD DEVICES

FIELD OF THE INVENTION

The present invention relates to an electronic device having a display and a method for presenting and browsing in metadata with a graphical user interface (GUI) receiving rotation sensor inputs.

BACKGROUND OF THE INVENTION

The scaling down of handheld electronic devices such as mobile phones and MP3 players challenges designers of user interface (UI) and GUI, since it is hard to achieve efficient user interaction with small and compact multifunctional devices. Addition of pushbuttons or overloading their use by introducing key sequences and complex menu systems have been previously explored but led to severe limitation of the user interactivity with the electronic device.

In the patent application U.S. 2003/0085870 is described a method to improve responsively of electronic devices by introducing sensing means on how devices are handled and translating user gestures into commands to be performed. In particular windows that are open in a specific orientation are hidden when the orientation change.

Also, the number and complexity of functions performed on such handheld devices in continuously increasing, which again increase performance demands on UI and GUI. It is therefore still seen as a problem to browse and navigate in large amounts of data due to the inherent limitations in screen size and UI.

Therefore to improve user interface efficiency there is a need for handheld electronic devices with user interfaces which are able to provide easy presentation and browsing in large amounts of data.

SUMMARY OF THE INVENTION

It is an object of the invention to preferably seeks to mitigate, alleviate or eliminate one or more of the above mentioned disadvantages, by allowing a user to open or close additional menus in a handheld display device by rotation of the device.

This object is achieved by providing, in a first aspect, an improved handheld electronic device having a display for presenting and browsing in metadata. Such an electronic display device solves the above mentioned problems of the prior art by using a graphical user interface controller configured to, upon rotation of the electronic display device, maintain a pane in the displayed graphical user interface with a menu being browsed before rotation and add or remove at least one pane in the displayed graphical user interface with a menu representing a hierarchical super-or sub-category of the category being browsed before rotation. An extra menu of related category entries can thereby be opened or closed by rotation of the device by the user, thereby providing the advantage of browsing data with reduced use of user interfaces such as pointing device and keyboard.

The GUI controller may e.g. be embodied by GUI software held in a memory of the device being connected to an electronic processor for accessing and executing the GUI software. Panes may herein be understood as separated sections in the GUI presenting related data, e.g. associated to the same data or object. Metadata is herein understood as data being descriptive of the content of the associated data and which can be ordered in different categories such as song title and artist categories for music files or sender and received-by-date categories for emails. The graphical user interface controller metadata can determine a hierarchical ordering of the metadata, meaning that the metadata categories are or can be, e.g. by the GUI controller, classified or assigned into successive levels or layers or an overlying hierarchical structure that may be logically determined by the types of metadata categories, but that can also simply be applied according to sequential (e.g. alphabetical) order. Each category is represented by a menu of category entries in the displayed graphical user interface and each menu is shown in a separate pane. The category being browsed means the menu of category entries being subject to user selection or navigation such as scrolling, marking up or highlighting, or other activity, or being the last menu wherein user made a selection or navigation.

In a second aspect, the invention provides a method for presenting and browsing in metadata on a handheld electronic device, the method comprising:
  providing metadata, typically related to a plurality of files, the metadata being arranged in different categories,
  determining a hierarchical ordering of the metadata;
  representing each category by a menu of category entries in a GUI to be shown on the display device, where each menu is shown in a separate pane;
  displaying a GUI with at least one pane containing a menu of category entries being browsed;
  rotating a display of the device, typically between a landscape and a portrait orientation;
  maintaining, in the displayed GUI, the pane with the menu being browsed before rotation; and
  adding or removing at least one pane in the displayed graphical user interface with a menu representing a hierarchical super-or sub-category of the category being browsed before rotation, so as to expand or collapse the display of one or more categories in the GUI.

In a third aspect, the invention relates to a software product for instructing a processing unit to execute the method, according to the previous aspect of the invention, when the product is run on an electronic processing unit in a handheld electronic device having a display.

The different definitions, embodiments, examples and implementations described in the above and in the following are applicable to all aspects of the invention, even though described in relation to one aspect only.

Examples of metadata for audio or video data comprise artists, albums, playlists, ratings, dates, genre, and titles. Examples of metadata for contact lists on mobile phones may be first/last name, company, group, relation, The referred rotation of the display device is from a first orientation to a second orientation, where the first orientation is preferably rotated approximately 90° from the second orientation. Preferably, a threshold rotation angle between the first and second orientation, such as 45 degrees, is set for which the GUI controller assumes that the user intends to shift orientation. Preferably, the display is rectangular and the first and second orientations are portrait and landscape orientations or vice versa.

In one embodiment, a menu is preferably added when the device is rotated from portrait to landscape, and the added pane will be shown next to the pane with the menu being browsed before rotation. Upon a second rotation back to portrait orientation, the menu not being browsed upon the second rotation may be removed. In another related embodiment, a menu is preferably added when the device is rotated from landscape to portrait, and the added pane will be shown above or under the pane with the menu being browsed before rotation. Upon a second rotation back to landscape orientation, the menu not being browsed upon the second rotation may be removed. These embodiments provide the advantages of allowing optimal utilization of the display area, and which embodiment to apply may depend of the type of metadata, the graphical representation and the application.

In yet another embodiment, a menu is preferably added when the device is rotated for the first time within a predetermined period of time and a menu is preferably removed when the device is rotated for the second time within a predetermined period of time. This provides the advantage that the user can quickly open and close an extra menu by rotating and counter-rotating the device, regardless of the initial orientation of the device. The predetermined period of time is applied to distinguish between the rotation that expands metadata and the counter-rotation that collapse metadata.

In a preferred embodiment, the pointing device is a multi point touchpad and selection and browsing make use of multi-point touch gestures. In this embodiment, the graphical user interface controller is preferably further configured to determine, by input from the multi point touchpad, expansion or pinching gesture of the user, and add or remove at least one pane in the displayed graphical user interface with a menu representing a hierarchical super- or sub-category of the category being browsed when the expansion or pinching gesture of the user was determined. This embodiment is advantageous as it provides further control of the expansion/collapsing of the various category menus. When applied e.g. to the above example, the user may through an expansion gesture on the multi point touchpad produce space for a third pane such as playlist, or remove one of the panes by a pinching gesture. The displayed panes may get skewed in case of lack of space and get arranged in order to be visible to the user.

In one embodiment of the invention, the first orientation and the second orientation are detected based on an analysis of data from one or more accelerometers, and the sensor for detecting rotation of the electronic display device is preferably a three-dimensional acceleration sensor. Such sensor allows determining both rotation and tilting of the display device. These motions can be defined by picturing an axis through the display and being normal to the display surface. Rotation is rotating the device around this axle while the axis is held pointing in a fixed direction, and tilting is changing the direction of the axis while not rotating the device. Most often, movements are a combination of tilting and rotation movements. When the device is for example held flat, e.g. lying on a table so that the axis is vertical, rotation detection may be disabled as landscape and portrait orientations are not unambiguously distinguished in such case.

Preferably, the rotation sensor allows application of hysteresis in determining changes in orientation. For example it delays the response to rotation for imprecise gesture which may occur accidentally.

The basic idea of embodiments of the invention is to enable expansion or collapsing of metadata categories shown in a GUI using a rotation sensor, thereby not requiring the use of traditional UI pointing devices for this action.

BRIEF DESCRIPTION OF THE DRAWINGS

The present invention will now be explained, by way of example only, with reference to the accompanying Figures, where.

DETAILED DESCRIPTION OF THE PRESENT INVENTION

In the following, embodiments of the handheld electronic device having a display and the method for browsing metadata according to the inventions are described in relation to FIGS. 1 through 3.

Figure 1:
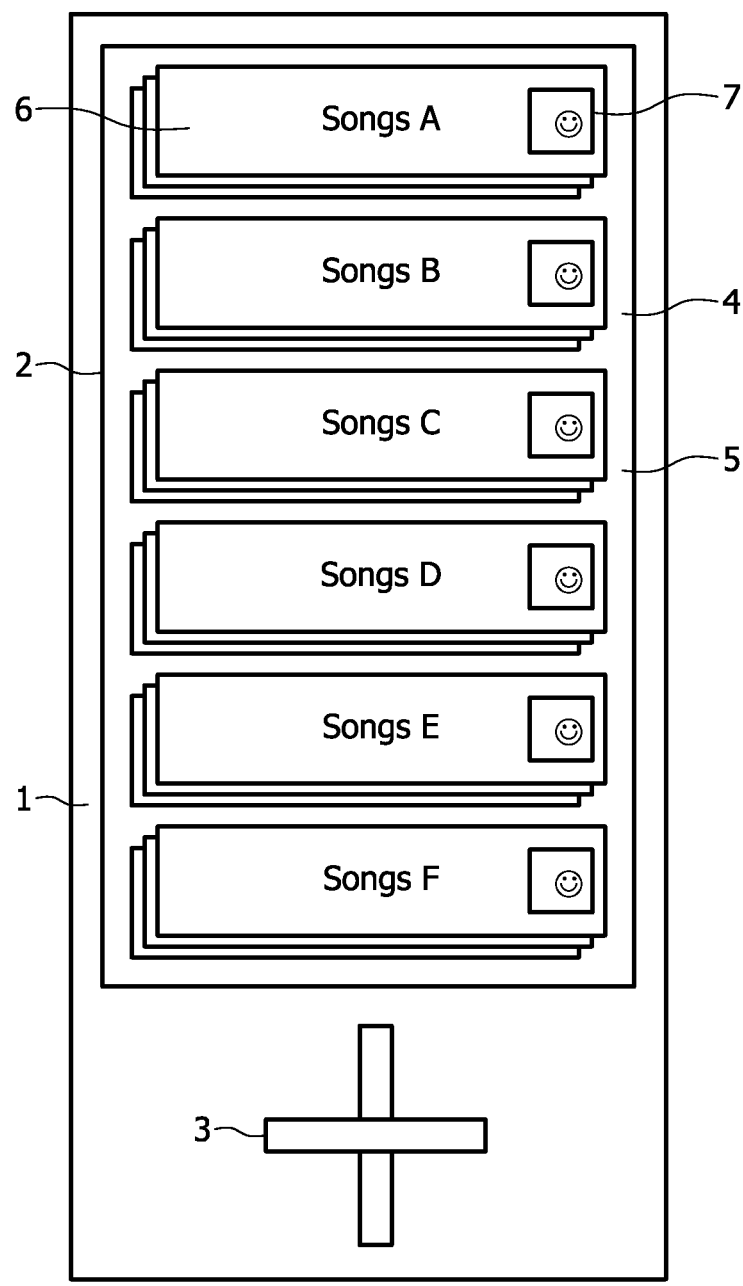
FIG. 1 is an illustration of an embodiment of the display device of the invention in portrait mode (first orientation).

FIG. 1 illustrates schematically an example of a handheld electronic device 1 having a display 2 for presenting and browsing in metadata in accordance with an embodiment of the invention. The display 2 displays a GUI for browsing in metadata. Inputs for browsing and selecting in the graphical user interface are entered by the user though a pointing device 3, such as a multi point touchpad, a mouse, a pointing stick, a roller, a touchpad or navigation/arrow buttons. The pointing device 3 in this embodiment is a multi point touchpad. The multi point touchpad 3 is used to receive user input for browsing and selecting in the graphical user interface. When the electronic device is held in the first orientation (here portrait), GUI controller (not shown) displays a first pane 4 containing a menu 5 of category entries 6 according to metadata. In this embodiment, the metadata category entries 6, being descriptive of the content of the associated data, here music files, is songs titles 6 associated to images 7. The user can browse the metadata by scrolling and/or selecting song titles in the menu.

Figure 2:
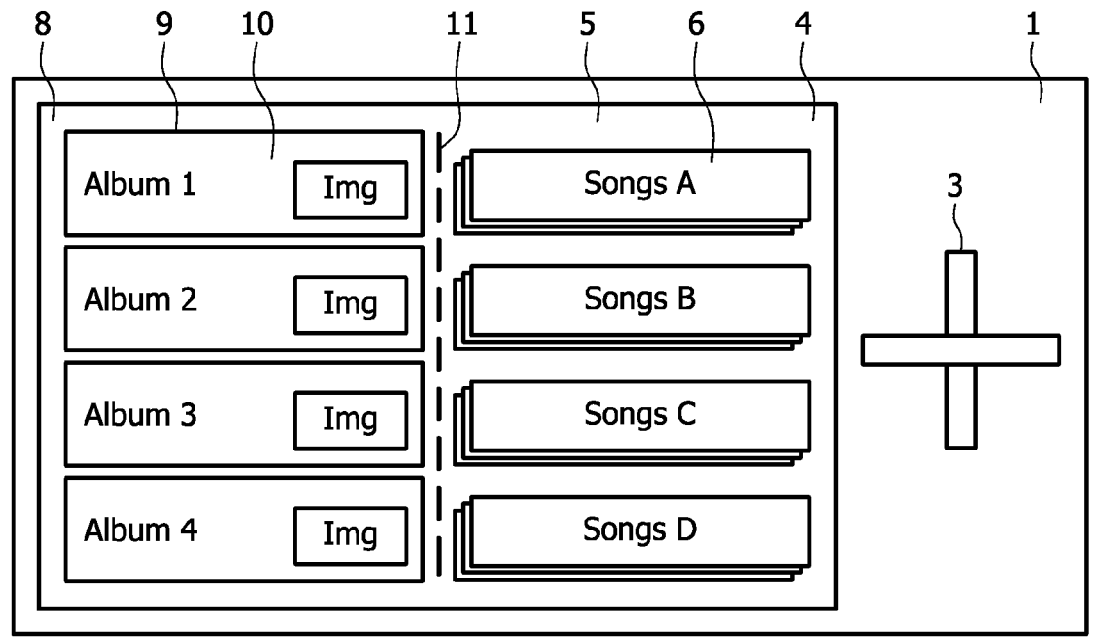
FIG. 2 is an illustration of the display device of FIG. 1 in landscape mode (second orientation) and with the addition of an extra pane with a menu of category entries.

FIG. 2 shows the display device 1 of FIG. 1 after rotation from the first orientation, to a second orientation (here landscape). A sensor for detecting rotation of the electronic display device (not shown) senses the rotation and sends an input to the GUI controller which detects a rotation between the different orientations. After the rotation, the GUI controller maintains the pane 4 in the displayed GUI with the menu 5 being browsed before rotation. Also, the GUI controller adds a pane 8 in the displayed GUI with a menu 9 representing a hierarchical super- or sub-category of the category being browsed before rotation. The metadata category of the new menu 9 is determined based on the hierarchical ordering of the metadata. This ordering may be inherent in the sequence that the metadata category entries are listed in the files (e.g. comma-separated or similar), and will thus simply be read by the GUI controller. Alternatively, the GUI controller may assign a hierarchical ordering to the metadata based on instructions programmed into the display device. As the person skilled in the art will realize, there are numerous options for hierarchical ordering metadata, depending on the type of device and the specific application. In the embodiment shown by FIG. 2, the menu 5 of songs titles 6 is maintained in the pane 4 and the menu 9 of albums titles 10, which is a super-category of the menu 5 of songs titles 6, is added in the second pane 8 in the displayed GUI. This second pane 8 is separated from pane 4 by a pane separator 11. The rotation from portrait orientation to landscape orientation thus led to an expansion of metadata categories shown in the GUI, here with a super-category of the metadata being browsed before rotation.

A similar embodiment, where a pane with a menu of category entries is removed from the displayed GUI can be envisioned by reversing the above process and rotating the device from the second orientation (FIG. 2) to the first orientation (FIG. 1). Before rotation, the menu 5 of pane 4 is being browsed. In this case, the rotation from portrait orientation to landscape orientation will lead to a collapse of metadata categories shown in the GUI, by removal of pane 8 with menu 9 representing a super-category of the metadata being browsed before rotation.

Several options of when to add and when to remove a pane and menu upon rotation, and different schemes for the user to control addition or removal of menus have been described previously. These can all be implemented similarly to the embodiment described in relation to FIGS. 1 and 2 above.

Figure 3:
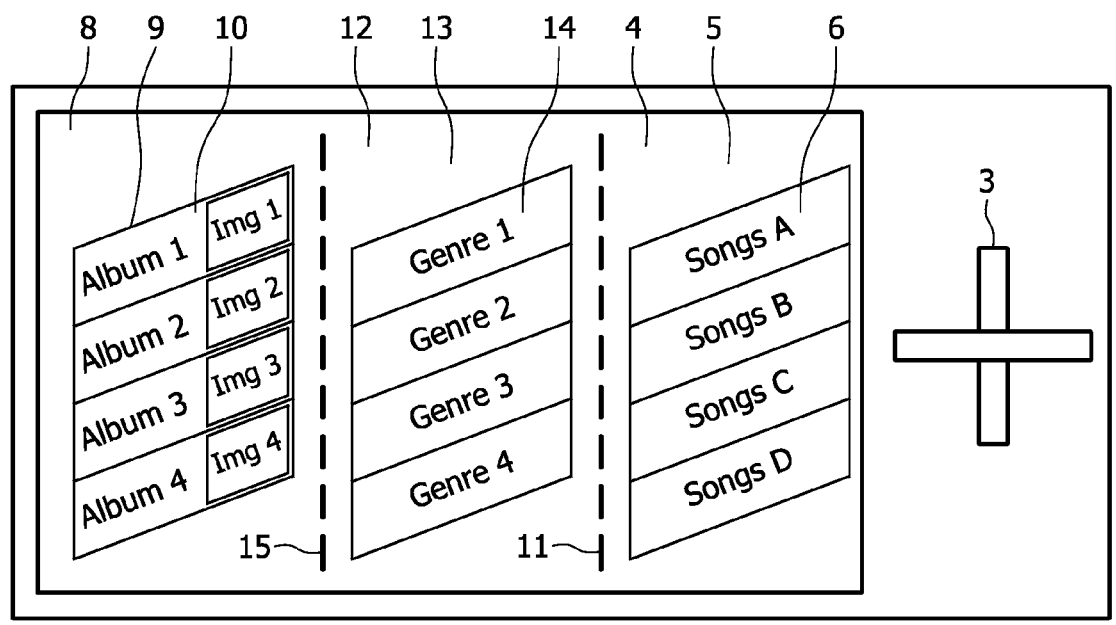
FIG. 3 is an illustration of the display device of FIG. 2 with the addition of an extra pane with a menu of category entries.

FIG. 3 shows another embodiment of the invention based on the device with multi point touch pad of FIGS. 1 and 2. Here, the graphical user interface controller is configured to cause, by expansion gesture of the user on the displayed GUI of FIG. 2, the addition of a third pane 12 containing a further menu 13 of metadata category entries 14. The existing panes 4 and 8 can get skewed to display the third pane 12 and accommodate more meta data. A second pane separator 15 is therefore present to delimit the three different panes. The user can further, by expansion gesture on the multi point touchpad, create new panes to accommodate more metadata. In this case the panes will reduce their dimension and the menus will preferably modify their skewing angle in order to make space for the new panes and still be visible to the user. If the user feels that he is not interested in one of the displayed panes, he can choose to only see the desired pane by hiding the undesired one using a pinching gesture.

The GUI controller of an embodiment of the invention can be implemented in any suitable form including hardware, software, firmware or any combination of these. The GUI controller or some features of it can be implemented as computer software running on one or more data processors and/or digital signal processors. The elements and components of an embodiment of the GUI controller may be physically, functionally and logically implemented in any suitable way. Indeed, the functionality may be implemented in a single unit, in a plurality of units or as part of other functional units.

Figure 4:
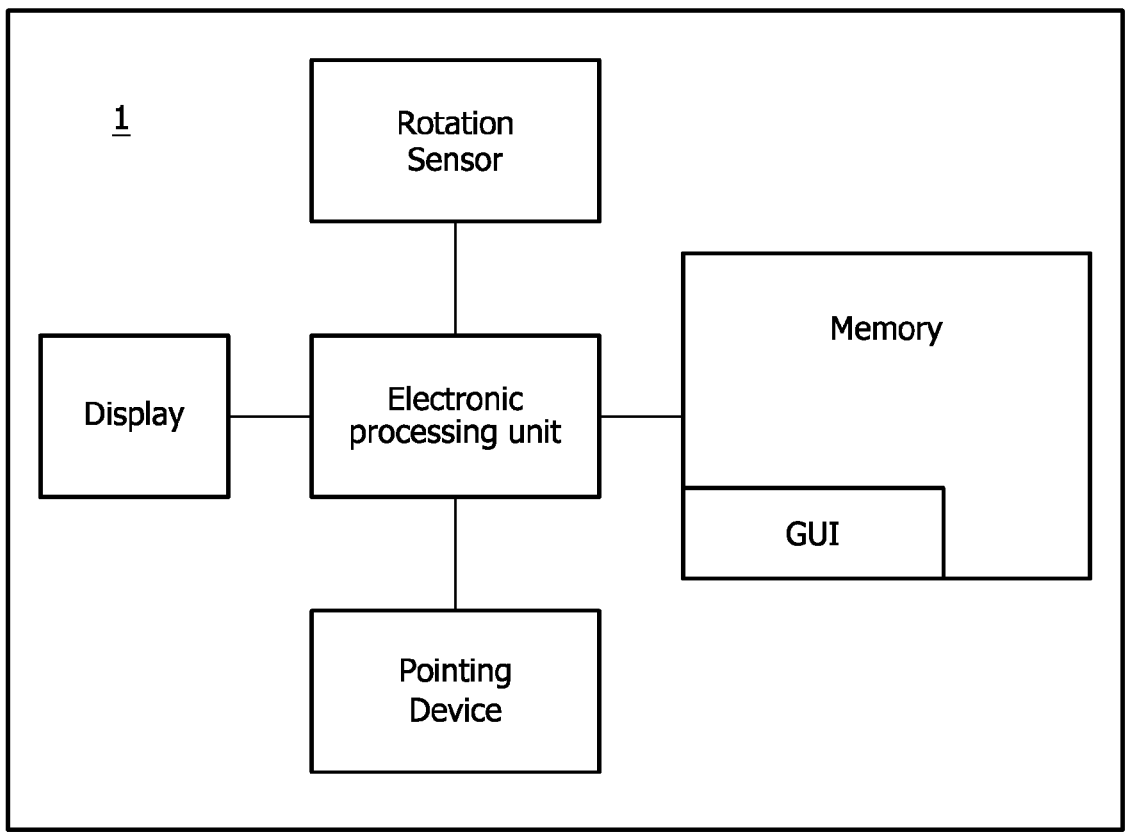
FIG. 4 is an illustration of the device.

FIG. 4 is a hardware illustration of an embodiment of the display device 1 according to an aspect of the invention. Here, the GUI controller is embodied as a software product stored in a memory, and being executed by an electronic processing unit. The memory can for example be a flash memory or a hard drive, and the electronic processing unit can for example be a CPU. In this case, the GUI controller is there provided by the combination of a GUI software product, a memory and a processor. The rotation sensor detects the orientation of the device and communicates the orientation to the GUI controller. The GUI controller determines the content of the displayed GUI by user inputs from the pointing device and the rotation sensor.

Figure 5:
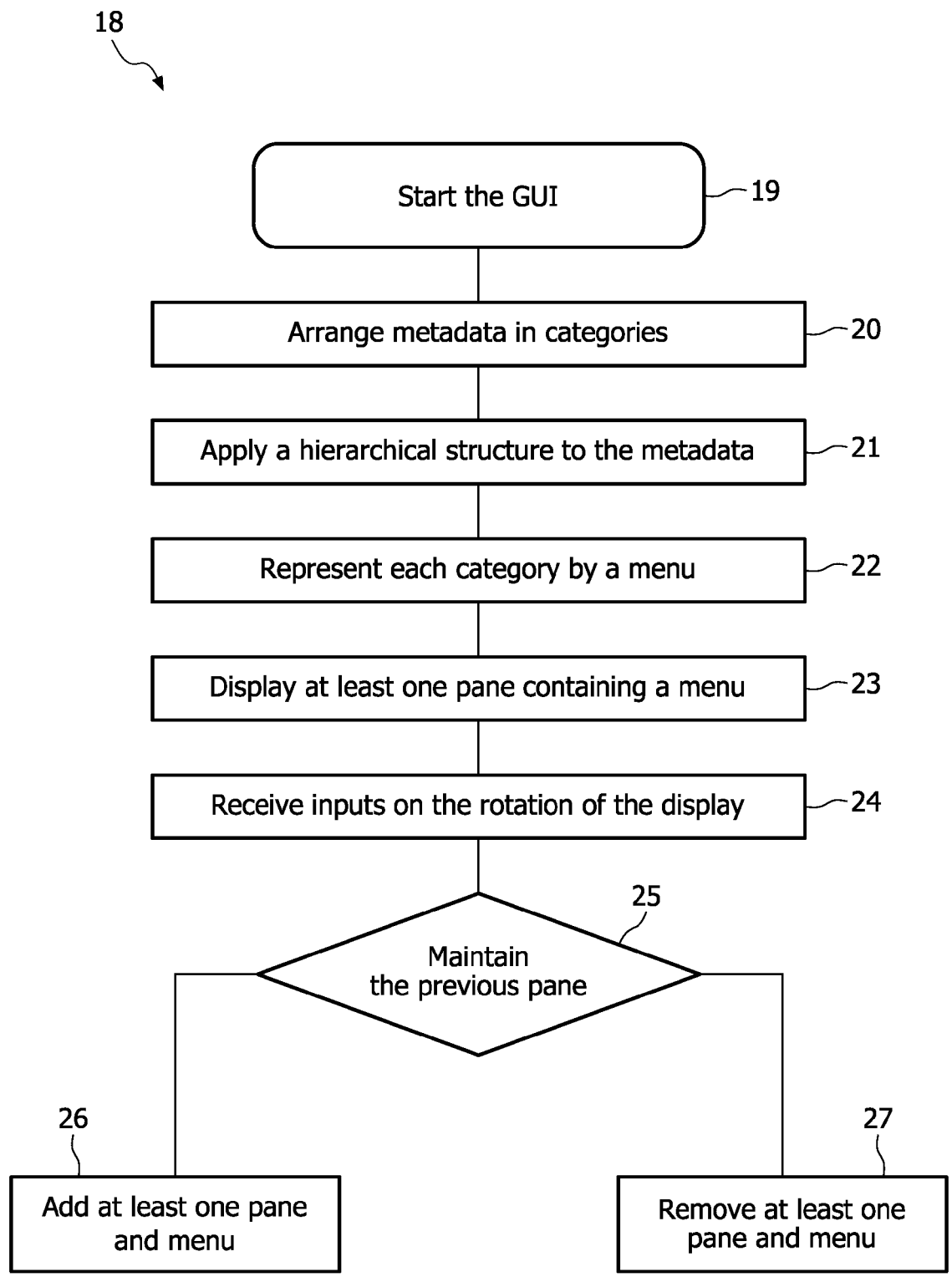
FIG. 5 is a flow-chart describing a method and a software product according to embodiments of the invention.

FIG. 5 represents a flow chart 18 for illustrating the architecture of an embodiment of a software product in accordance with an aspect of the invention, such as the GUI software product referred in relation to FIG. 4. In addition, the flow chart 18 illustrates an embodiment of the method for presenting and browsing in metadata in accordance with another aspect of the invention.

In box 20, the GUI software accesses the metadata and arranges them in categories. The metadata may be stored in the same memory of the display device as the GUI software, in another memory of the display device, or external to the display device, such as accessible through a network connection. In box 21 the GUI applies a hierarchical ordering of the metadata, which in a simple embodiment means that it detects or assigns an order in which metadata categories are to be sub/super categories to each other when adding or removing menus as described below. In box 22, the GUI software represents each category by a menu of category entries, as illustrated e.g. by menu 5 showing a list of songs 7 in FIG. 1. In box 23 the GUI software provides outputs to display at least one pane containing a menu in the display. In box 24, the GUI software receives input from rotation sensor and maintain in the display the previous pane (box 25) with a menu being browsed before rotation and either add at least one pane (box 26) or remove one pane (box 27) with a menu representing a hierarchical super- or sub-category of the category being browsed before rotation.

The invention is particularly, but not exclusively, advantageous for handheld devices which displays content having multiple metadata, like music players, mobile phones, PDA's, digital cameras, electronic calendars, electronic mail box, office applications, e.g. Excel. As an example, the invention may be applied to any portable display device that may be rotated by a user. The term "handheld" has been used throughout this specification merely to indicate that the display device is a device which a user can manipulate or rotate in a suitably manageable manner and that such manipulation or rotation by a user is preferably to be performed by hand. As a further example, the invention may be applied to music players such as in the i-Pod Touch® or i-Phone®. In these, a rotation from portrait to landscape orientation after browsing in metadata category like songs titles, lead to a single pane representation of the category albums titles, but where the song titles are not visible. By applying the present invention, rotation of the device from portrait to landscape, may lead to an expansion into a two pane GUI, e.g. a menu representing the category album titles in one pane and a menu representing the category song titles in the other.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A handheld electronic device for presenting and browsing in metadata, the display device comprising:
   a display for displaying a graphical user interface for browsing in metadata;
   a pointing device for receiving user input for browsing and selecting in the graphical user interface;
   a sensor for detecting rotation of the display device;
   a graphical user interface controller configured to:
   determine a hierarchical ordering of metadata arranged in different categories;
   represent each category by a menu of category entries in the displayed graphical user interface, wherein each menu of category entries is shown in a separate pane when displayed in the graphical user interface;
   determine rotation between different orientations of the display device by input from the sensor; and
   responsive to a rotation of the display device:
   maintain a pane in the displayed graphical user interface that comprises a menu of category entries (i) being browsed before the rotation and (ii) which corresponds to a last menu of category entries being subject to a user selection or navigation before the rotation; and add or remove at least one pane in the displayed graphical user interface that comprises an extra menu of category entries representing a hierarchical super- or sub-category of the category represented by the menu of category entries (i) being browsed before the rotation and (ii) which corresponds to the last menu of category entries being subject to the user selection or navigation before the rotation, wherein the pointing device is a multi point touchpad and wherein selection and browsing make use of multi-point touch gestures, and wherein the graphical user interface controller is further configured to determine, by input from the multi point touchpad, an expansion or pinching gesture of the user, and add or remove, respectively, at least one pane in the displayed graphical user interface that comprises a menu of category entries representing a hierarchical super- or sub-category, respectively, of the category represented by the menu of category entries being browsed when the expansion or pinching gesture of the user was determined, and further wherein responsive to an expansion gesture of the user with respect to a pane of a given category menu of various category menus in the displayed graphical user interface, the graphical user interface controller produces space for an additional pane within the displayed graphical user interface, wherein (i) displayed panes are reduced in dimension and (ii) menus of the displayed panes are skewed with a skewing angle in order to make space for the additional pane and still be visible to the user.

2. The display device according to claim 1, wherein said metadata comprise artists, albums, playlists, ratings, dates, genre, titles related to audio or video data.

3. The display device according to claim 2, wherein the sensor for detecting rotation of the display device is a three-dimensional acceleration sensor.

4. A method for presenting and browsing in metadata on a handheld electronic device, the method comprising:
providing metadata arranged in different categories;
determining a hierarchical ordering of the metadata;
representing each category by a menu of category entries in a graphical user interface to be shown on a display of the device, wherein each menu of category entries is shown in a separate pane in the graphical user interface when shown on the display;
displaying the graphical user interface with at least one pane containing a menu of category entries being browsed;
rotating the device;
maintaining, in the displayed graphical user interface, the pane that comprises the menu of category entries being browsed before a rotation corresponding to a last menu of category entries being subject to a user selection or navigation before the rotation; and
adding or removing at least one pane in the displayed graphical user interface that comprises an extra menu of category entries representing a hierarchical super- or sub-category of the category represented by the menu of category entries (i) being browsed before the rotation and (ii) which corresponds to the last menu of category entries being subject to the user selection or navigation before the rotation,
wherein selection and browsing make use of multi-point touch gestures, via a multi point touchpad, and
determining, by input from the multi point touchpad, an expansion or pinching gesture of the user, and adding or removing, respectively, at least one pane in the displayed graphical user interface that comprises a menu of category entries representing a hierarchical super- or sub-category, respectively, of the category represented by the menu of category entries being browsed when the expansion or pinching gesture of the user was determined, and further wherein responsive to an expansion gesture of the user with respect to a pane of a given category menu of various category menus in the displayed graphical user interface, producing space for an additional pane within the displayed graphical user interface, wherein (i) displayed panes are reduced in dimension and (ii) menus of the displayed panes are skewed with a skewing angle in order to make space for the additional pane and still be visible to the user.

5. A non-transitory computer readable medium embodied with a software program for instructing a processing unit to execute the method of claim 4 in response to the software program being loaded and run on the processing unit.

* * * * *